United States Patent Office 3,539,537
Patented Nov. 10, 1970

3,539,537
POLYAMIDE-ACIDS AND POLYIMIDES PREPARED BY REACTING ORGANIC DIANHYDRIDES WITH AROMATIC DIAMINO CYCLIC SULFONES
Fred F. Holub, Scotia, and John T. Hoback, Schenectady, N.Y., assignors to General Electric Company, a corporation of New York
No Drawing. Filed May 8, 1968, Ser. No. 727,667
Int. Cl. C08g 20/32
U.S. Cl. 260—78
12 Claims

ABSTRACT OF THE DISCLOSURE

The reaction of organic dianhydrides with aromatic diamino cyclic sulfones gives polyamide-acids which upon heating are converted to the polyimide structure. The invention also includes a method for making the aromatic diamino cyclic sulfones. The compositions herein described are useful as insulation for electrical conductors and as high temperature protective films.

This invention relates to novel polymeric materials made from the reaction of an aromatic diamino cyclic sulfone (hereinafter referred to as "cyclic sulfone") and an organic dianhydride, and ultimate conversion of the polyamide acid reaction product to the polyimide structure. More particularly, the invention is concerned with a composition of matter selected from the class consisting of (1) polyamide-acids composed of recurring structural units

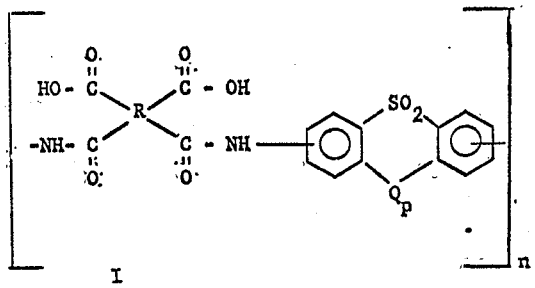

where Q is a member selected from the class consisting of —$CH_2$—, —$C(CH_3)_2$—, —$C(C_6H_5)_2$—, —O—, —S—, —$SO_2$—, —$Si(CH_3)_2$—,

and —NR′—, where R′ is hydrogen or methyl, $n$ is an integer greater than one (e.g., from 10 to 10,000 or more) and $p$ is a whole number from 0 to 1 inclusive, and (2) a polyimide composed of recurring structural units of the formula

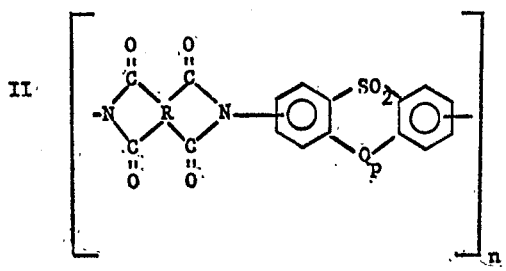

(a) [1]

[1] In any recurring unit, the carbonyl groups to which the nitrogen groups in the polymeric structure are attached may exist in interchanged position.

where Q, $p$ and $n$ have the meanings above, R in (I) and (II) being an organic tetravalent radical preferably containing at least one ring of six carbon atoms, said ring characterized by benzenoid unsaturation, the four carbonyl groups of each polyamide-acid or polyimide unit being attached directly to separate carbon atoms in a ring, each pair of carbonyl groups being attached to adjacent carbon atoms in a ring of the R radical, and the nitrogens are meta or para to Q.

The invention also includes a method for making cyclic sulfones of the formula

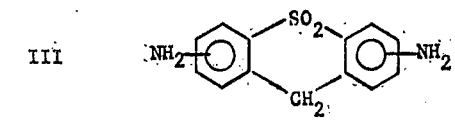

where the $NH_2$ radical is meta or para to the methylene (—$CH_2$—) group, by effecting reaction between a diamino compound of the formula

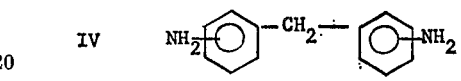

where the $NH_2$— groups are meta or para to the methylene group, and sulphur trioxide in an inert solvent.

U.S. Pat. 3,179,614 and U.S. Pat. 3,179,634, both issued Apr. 20, 1965, disclose, respectively, polyamide-acids and polyimides made from a tetracarboxylic acid or anhydride reacted with an organic aromatic diamine. Included among the organic aromatic diamines are 3,3′-diaminodiphenylsulfone and 4,4′-diaminodiphenylsulfone, both linear compositions. Although polyamide acids, and ultimately polyimides, derived from the reaction of these linear sulfone compounds with the tetracarboxylic acid or anhydride have been found to have good properties, it would be desirable to improve certain characteristics of polymers therefrom, particularly their resistance to elevated temperatures especially when employed as insulation for electrical conductors. One of the important requirements for insulated conductors, particularly fine wire insulated conductors as used in motors, is that it be able to withstand winding operations so that the superposition of one layer of wire on the other during the winding operation will not effect any cut-through so as to cause short circuits in the wound motor. Although the use of the linear aromatic diamino sulfones imparts good properties in this respect, we have unexpectedly found that by employing a cyclic sulfone of the general formula

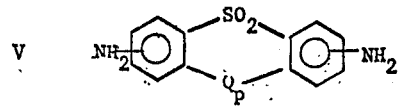

wherein Q and $p$ have the meanings above and the $NH_2$ groups are meta or para to the Q group, marked improvement in the heat resistance and cut-through temperature of the insulated conductors can be achieved.

The main object of the present invention, therefore, is to provide soluble or shapeable compositions of polyamide-acids which can be converted to polyimide structures having even more desirable properties than those derived from polyamide-acids made from non-cyclic sulfone diamino compounds. Other objects will appear hereinafter as the invention is described in greater detail.

The process of preparing the polyamide acid composition comprises reacting, by mixing and stirring at least one organic diamino cyclic sulfone of Formula V with at least one tetracarboxylic acid dianhydride, advantageously in an organic liquid which is a solvent for at least one reactant, said solvent being inert to the reactants and preferably under anhydrous conditions for a time of the order of at least one minute and at temperatures below 175° C., sufficient to provide a solution containing at least 50% of the corresponding polyamide acid. In determining a specific time and a specific temperature for forming the polyamide acid, several factors should be considered. The maximum permissible temperature will depend on the particular aromatic cyclic sulfone diamine or any other diamine used in combination therewith, the dianhydride used, the particular solvent, the percent solids of polyamide acid resin which is desired in the final solution, and the minimum period of time one desires for reaction. Generally, temperatures below 100° C. are adequate for the purpose. As the temperature increases, there is a tendency for the polyamide acid to imidize therefore increasing the chances for greater insolubility of the final product in the solvent. An advantageous temperature of reaction to form a product of maximum degree of polymerization and yet have a satisfactory degree of solubility requires that temperatures throughout the reaction should be maintained below 50° C., and advantageously between 20–35° C.

After forming the polyamide-acid solution, the unreacted materials can be removed and the solution used as such for coating purposes, for film formation, etc. Alternatively, the polyamide-acid may also be treated to remove solvent and used as a shapeable (i.e., moldable) material.

In general, the process for making the polyamide-acid involves premixing approximately equimolar amounts of the aromatic cyclic sulfone diamine and the dianhydride and adding the mixture in small portions with agitation to the organic solvent. Dissolving each of the reactants in a solvent and thereafter mixing the two solutions may also be employed. Since the reaction tends to be exothermic and to accelerate quite rapidly, it is important in many instances to regulate the additions and the temperature to maintain the reaction temperature below a predetermined value, such value being based on the desirability of obtaining a certain percentage of the polyamide-acid in the final reaction product. In all instances, agitation of the reactants is advantageously employed while at the same time maintaining anhydrous conditions. The molar concentration is usually equimolar for obtaining a high molecular weight product. However, the use of either reactant in an excess of up to 5 mole percent is not precluded. Greater molar excesses result in reduction of the molecular weight.

The polyamide-acid thus formed can be characterized by its degree of molecular weight and solubility by means of its intrinsic viscosity when measured at 30° C., at a concentration of 0.5 percent, by weight, of the polymer in a suitable solvent such as N-methyl-2-pyrrolidone. The intrinsic viscosity of the polyamide-acid should be at least 0.1 and preferably in the neighborhood of about 0.2 to 4 or 5.

The quantity of organic solvent used in the present invention need be only that sufficient to dissolve enough of the reactants to form a medium for initiation of the reaction between the aromatic sulfone diamine and the dianhydride. Generally, the solvent comprises from 10 to 90% of the total weight of all the ingredients.

Although the invention is intended to focus on the use of the aromatic cyclic sulfone diamine, it will be apparent to those skilled in the art that other aromatic (or even aliphatic) diamines may be used in conjunction with the cyclic sulfone diamine without departing from the scope of the invention. Thus, the cyclic sulfone diamine may be substituted with up to 40 to 80%, by weight, thereof with another organic diamine of the formula

VI            $H_2N-R''-NH_2$ where R'' is a divalent organic radical and may be any one of the following groups: aromatic, aliphatic, cycloaliphatic, a combination of aromatic and aliphatic, heterocyclic, bridged organic radicals wherein the bridge is oxygen, nitrogen, sulfur, silicon or phosphorus, or substituted groups thereof. More generally, the diamines used with the cyclic sulfone diamines are primary diamines. Among the diamines which are suitable for use in the present invention in combination with cyclic sulfone diamines are meta-phenylene diamine; para-phenylene diamine; 4,4-diamino-diphenyl propane; 4,4'-diamino-diphenyl methane; benzidene; 4,4'-diamino-diphenyl sulfide; 3,3'-diamino-diphenyl sulfone; 4,4'-diamino-diphenyl sulfone; 4,4'-diamino-diphenyl ether; 2,6-diamino pyridine; bis-(4-amino-phenyl) diethyl silane; bis-(4-amino-phenyl) phosphine oxide; bis-(4-aminophenyl)-N- methylamine; 1,5-diamino-naphthalene; 3,3' - dimethyl-4,4'-diamino-biphenyl; 3,3'-dimethoxy benzidene; 2,4-bis-(betaamino-t-butyl-phenyl) ether; para-bis-(2-methyl-4 - amino-pentyl) benzene; para-bis-(1,1-dimethyl-5-amino-pentyl) benzene; m-xylylene diamine; p-xylylene diamine; bis(para-amino-cyclohexyl) methane; hexamethylene diamine; hepta-methylene diamine; octamethylene diamine; nonamethylene diamine; decamethylene diamine; 3-methylheptamethylene diamine; 4,4-dimethylheptamethylene diamine; 2, 11 - diamino-dodecane; 1,2-bis-(3-amino propoxy) ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane;

$H_2N(CH_2)_3O(CH_2)_2O(CH_2)_3NH_2$; $H_2N(CH_2)_3S$
        $(CH_2)_3NH_2$;$H_2N(CH_2)_3N(CH_3)(CH_2)_3NH_2$;

and mixtures thereof.

Among the tetracarboxylic dianhydrides which may be employed in the present invention are the many which are described in U.S. 3,179,614 which by reference is made part of the disclosure of the instant application and include, for instance, pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl) propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4 - dicarboxyphenyl) ether dianhydride, 3,3',4,4'-benzophenone tetracarboxylic acid dianhydride (hereinafter referred to as "BPDA") etc.

Any solvent may be employed in making the polyamide acids. The solvent should be inert to the system and should be a solvent for the reaction product, and certainly must be a solvent for at least one of the reactants and preferably for both of the reactants. Additionally, the solvent should be one which can be readily removed by volatilization and by application of reasonable amounts of heat. Among such solvents which may be mentioned are N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methyl-formamide and N-acetyl-2-pyrrolidone. The solvents can be used alone, in combinations of solvents, or in combination with poor solvents such as benzene, benzonitrile, dioxane, butyrolactone, xylene, toulene and cyclohexane.

The aromatic cyclic sulfones of Formula V can be prepared by several methods. One method for preparing such compositions of matter is found in Berichte, vol. 27, page 2806 (1894). Although the desired composition can be obtained in accordance with the directions in this article, it has been found that excessive quantities of materials, particularly solvents, and excessive times are required, thereby adding to the expense of making the desired product and removing undesirable by-products and unreacted materials. We have unexpectedly found that we can obtain good yields of the aromatic cyclic sulfone by a process which involves reacting a methylene dianiline, e.g., 4,4'-diaminodiphenylmethane, 3,3'-diphenyldiaminomethane, etc., with sulfur trioxide in the liquid phase in the presence of an inert liquid solvent, that is, a solvent which is inert to either the reactants or to the reaction products. The reaction proceeds quite readily at room temperature but can be accelerated by applying heat and, therefore, temperatures up to 75° C., or possibly higher may be employed for the purpose. Generally cooling of the reacting materials is required to maintain control of the reaction.

Among the inert solvents which may be employed in making the cyclic sulfones of Formula III, are liquid inert solvents, such as carbon tetrachloride, carbon tetrafluoride, perhalogenated ethane, tetrachloroethylene, perhalogenated propane, perhalogenated butane, etc. The time of reaction can vary widely depending upon the temperature at which the reaction is carried out. Thus, the reaction may proceed for times ranging from about 5 minutes to 2 hours or more. Generally, atmospheric pressure is adequate for the purpose, but superpressure or subatmospheric pressure may be used if desired under proper conditions. The molar concentrations of the reactants can be varied within fairly wide limits and are not critical. Generally, we have found that for each mole of methylene dianiline, one can employ from 1 to 4 or more moles of the sulfur trioxide.

After the initial reaction has been carried out, preferably while vigorous stirring is employed and cooling (as low as −10 to 10° C.) is also used to prevent runaway conditions because the reaction is exothermic, the reaction product is added to sufficient ice water and thereafter neutralized with a neutralizing agent, such as sodium hydroxide. The reaction product can then be isolated and purified by techniques well known in the art.

A typical method used to make the cyclic aromatic sulfone of Formula III is as follows:

About 3.07 grams (0.0155 mole) 4,4'-methylene dianiline in 25 ml. carbon tetrachloride was admixed under cooling conditions with 1.92 grams (0.024 mole) liquid sulfur trioxide which itself was dissolved in 25 ml. of carbon tetrachloride. The sulfur trioxide was added dropwise over about a 30-minute period, with vigorous stirring, to the solution of the methylene dianiline. The solution was allowed to warm to room temperature (about 25–30° C.,) and thereafter it was poured into 200 ml. of ice water. When the solution was neutralized with sodium hydroxide, a precipitate formed which was removed and washed with additional water to give 4,4'-methylene 3,3'-sulfonyl dianiline, melting at 217° C. in about a 70% yield. Analysis of this composition which had the formula VII 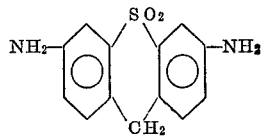

showed the following:

*Analysis.*—Theoretical (percent): C, 60.0; H, 4.62; N, 10.8; S, 12.3. Found (percent): C, 60.2; H, 4.5; N, 10.8; S, 12.5. D It will, of course, be recognized by those skilled in the art, that by employing the 3,3'-methylene-dianiline in place of the methylene dianiline used in the foregoing example, one can obtain 3,3'-methylene-4,4'-sulfonyl dianiline.

It will be apparent that other aromatic cyclic sulfones of Formula V where Q represents other radicals (in addition to the methylene radical) and $p$ is 1, can be made by the same method but employing the starting aromatic diamino compound which contains the appropriate Q group. Thus, the preparation for the following diamino cyclic sulfones may be found in the literature and the following references are given for verification of means for preparing these compositions, it being understood that analogous processes can be used to make the remaining aromatic cyclic sulfones encompassed by Formula V: 2,8-diaminothiaxanthone dioxide having the formula

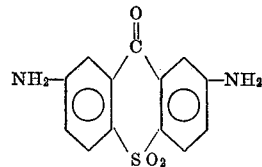

can be prepared in accordance with the directions found in the article by E. D. Amstutz and C. R. Neumoyer, J. Am. Chem. Soc. 69, 1925 (1927); the compound 2,8-diaminophenothiazine-5-dioxide having the formula

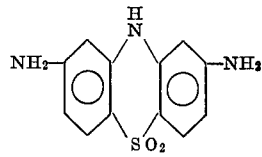

can be prepared in accordance with the directions described in an article by J. G. Michels and E. D. Amstutz, J. Am. Chem. Soc., 72, 888 (1950); the compound 2,8-diaminophenoxathiin-5-dioxide having the formula

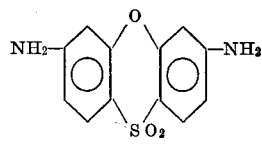

can be prepared in accordance with the directions found in an article by E. D. Amstutz, J. Am. Chem. Soc., 72, 3420 (1950); the compound 2,8-thianthrenediamine-5,5,10,10-tetraoxide having the formula

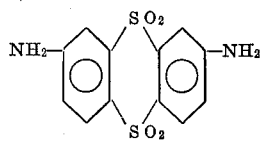

can be prepared in accordance with the directions described in a Japanese article by T. Kawai and T. Ueda, Yakygaku Zassi 80, 1648 (1960); the compound having the formula

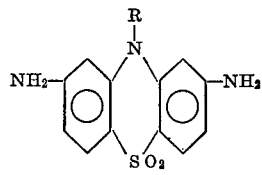

where R is —CH$_3$ or —C$_2$H$_5$, can be prepared in accordance with the directions in the article by L. Daleva, Farmatsiys (Sofia) 1961, No. 4, 7–16 and by H. Gilman et al., J. Org. Chem., 26, 2938 (1961); the compound 3,7-diamino-dibenzothiophene-5-dioxide (benzidene cyclic sulfone) having the formula

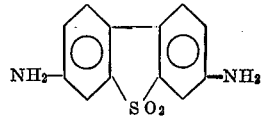

the preparation of which is shown in an article by Courtot and Evain Bull. Soc. Chem. [4] 49, 528 (1931), etc.

In order that those skilled in the art may better understand how our invention may be practiced, the following exampes are given by way of illustration and not by way of limitation. All parts are by weight unless otherwise indicated.

In the following examples, it is desirable to determine whether the insulation on a magnet wire will flow when the wire is raised to an elevated temperature under compressive stress. To establish this, the cut-through temperature is determined. This cut-through temperature is the temperature at which the enamel wire separating two magnet wires crossed at 90° and supporting a given load on the upper wire flows sufficiently to establish electrical contact between two conductors. Since magnet wires in electrical apparatus may be under compression, it is important that the wires be resistant to softening by high temperatures so as to prevent short circuits within the apparatus. The tests are conducted by placing two eight inch lengths of enameled wire perpendicular to each other under a load of 1000 grams at the intersection of the two wires. A potential of 10 volts A.C. is applied to the end of each wire and a circuit which contains a suitable indicator such as a buzzer or neon lamp is established between the ends of the wires. The temperature of the crossed wires and the load is then increased at the rate of 3 degrees per minute until the enamel softens sufficiently so that the bare conductors come into contact with each other and cause the neon lamp or buzzer to operate. The temperature at which this circuit is established is measured by a thermocouple extending into a thermowell to a point directly under the crossed wires. The cut-through temperature is taken as the temperature in the thermowell at the moment when the current first flows through the crossed wires.

EXAMPLE 1

A reaction vessel flushed with nitrogen was charged with 2.46 grams (0.01 mole) benzidine cyclic sulfone, 3.22 grams (0.01 mole) BPDA, and 22.72 grams N-methyl-2-pyrrolidone (as a solvent). The mixture was stirred vigorously at room temperature for 15 minutes until a homogeneous solution was obtained containing a polymeric composition in about 20% solids and composed of recurring stuctural units of the formula

VIII

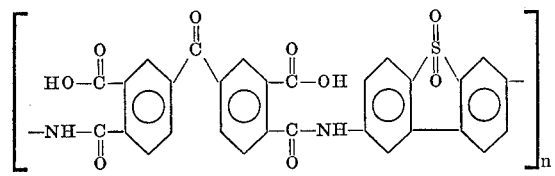

where $n$ is a whole number in excess of 1. The intrinsic viscosity of the polymer in the N-methyl-2-pyrrolidone was $[\eta]=1.01$. The solution was filtered and films of the filtered solution were cast on a glass surface and heated under nitrogen at 100° C. for one hour, at 150° C. for one hour, at 200° C. for one hour and at 250° C. for 15 minutes until the amid acid resin was converted to a flexible polyimide film composed of recurring structural units having the formula

IX

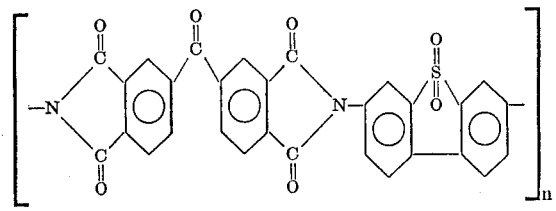

where $n$ has the meaning given above. The film had a tensile strength of 25,640 p.s.i. A polyimide film made from BPDA and benzidine diamine under the same conditions was less flexible and had a tensile of 16,440 p.s.i.

For comparison, a polyamide-acid resin was made similarly as above but substituting instead the linear 4,4'-diaminodiphenylsulfone in place of the cyclic sulfone. A filtered solution of this resin was cast on a glass surface similarly and heated at elevated temperatures employing a cure cycle as recited above, to obtain the polyimide form of the resin.

When each of the polyimide films obtained above (excluding the benzidine diamine film) was tested for cut-through temperature by the procedure recited previously, it was found that whereas the cut-through temperature of the polyimide made from the linear sulfone was about 340° C., the cut-through temperature of the polyimide made with the aromatic cyclic sulfone was in excess of 415° C.; in addition this latter film had a corona resistance about 2.4 times that of a polyethylene terephthalate film.

EXAMPLE 2

Employing the conditions recited in Example 1, 2.63 grams (0.01 mole) 4,4'-methylene-3,3'-sulfonyldianiline, 2.18 grams (0.01 mole) pyromellitic dianhydride and 19.23 grams N-methyl - 2 - pyrrolidone were reacted to give a polyamide-acid solution of about 20% solids composed of recurring structural units of the formula

X

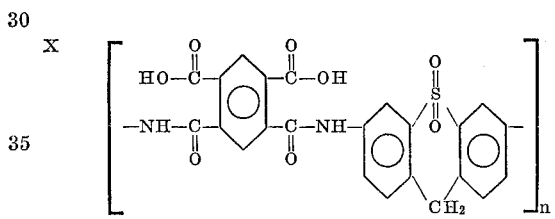

The filtered solution was heated at 100° C. for one hour, 150° C. for one hour, 200° C. for one hour, and 250° C. for one hour to give a flexible film of the corresponding polyimide form which had a cut-through temperature of greater than 415° C., $n$ being the same as above.

This polyimide was composed of recurring structural units of the formula

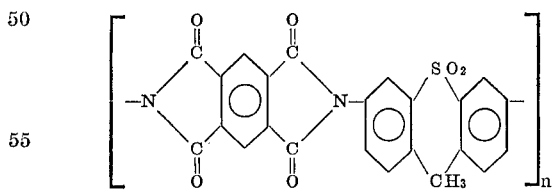

where $n$ is a whole number in excess of 1.

EXAMPLE 3

Using the same conditions as recited in Example 1, a polyamide acid resin was prepared from 2.46 grams (0.01 mole) benzidine sulfone diamine, 6.08 grams (0.01 mole) 4,4' - N,N' - diphenyl - p - phenylenediamine-bis-anhydrotrimellitic dianhydride (obtained by reacting N, N'-diphenyl-p-phenylenediamine in the ratio of 1 mole of the latter per two moles of trimellitic anhydride, the preparation of which is more particularly described in the copending application of Fred F. Holub, Ser. No. 440,387, filed Mar. 17, 1965, and assigned to the same assignee as the present invention), and 34.16 grams N-methyl-2-pyrrolidone. The polyamide-acid thus obtained (which had an intrinsic viscosity $[\eta]=1.7$) composed of recurring units of the formula

XI

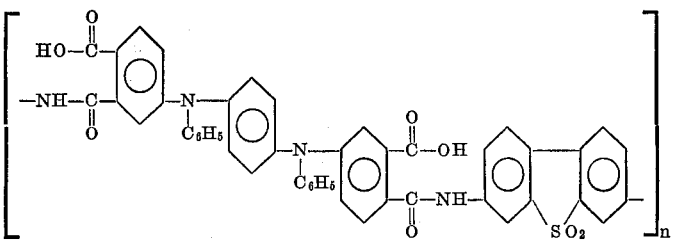

where $n$ is a whole number greater than 1, was cast on a glass surface and cured under nitrogen at 100° C. for one hour, 150° C. for one hour, 200° C. for one hour, and at 250° C. for 15 minutes to give a flexible film of the corresponding polyimide having a cut-through temperature of 305° C. This polyimide was composed of recurring structural units of the formula

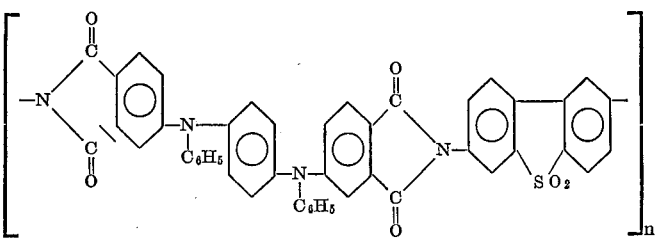

where $n$ is a whole number greater than 1.

EXAMPLE 4

Employing the same conditions as recited in Example 1, a polyamide acid resin was prepared from 2.63 grams (0.01 mole) 4,4'-methylene-3,3'-sulfonyldianiline, 4.1 grams (0.01 mole) 4,4' - ethylene - bis - anhydrotrimellitate (prepared by reacting ethylene glycol with trimellitic anhydride, the preparation of which is described in the copending application of Fred F. Holub, Ser. No. 638,636, filed May 15, 1967, and assigned to the same assignee as the present invention), and 26.9 grams of N-methyl-2-pyrrolidone. The polyamide acid resin obtained which was composed of recurring structural units of the formula

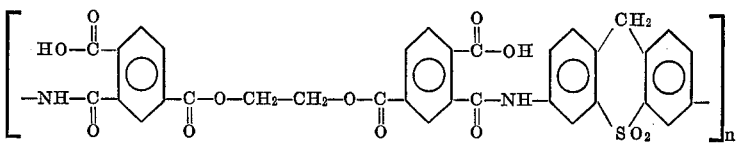

where $n$ is a whole number in excess of 1, was filtered and a portion of the 20% solids solution was cast on a glass surface and cured similarly as was done in Example 3 to yield a flexible polyimide film which had a cut-through temperature of 295° C. The polyimide was composed of recurring structural units of the formula

XII

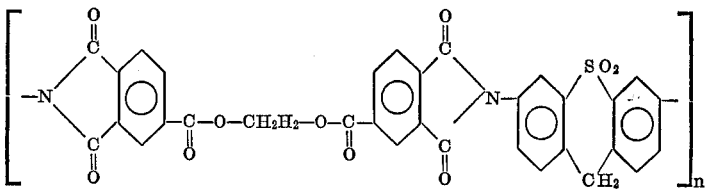

where $n$ is a whole number greater than 1.

The following two examples illustrate polymer compositions which can be obtained by replacing part of the aromatic cyclic sulfone with an aromatic diamine free of a sulfone grouping.

EXAMPLE 5

Employing the conditions and procedures recited in Example 1, a mixture of 0.1 mole BPDA, 0.05 mole 4,4'-methylenedianiline and 0.05 mole of the aromatic cyclic sulfone employed in Example 2, was stirred vigorously in an N-methylpyrrolidone solvent to give a solution which upon filtering and curing on a glass surface similarly as in Example 1 gave a clear, flexible polyimide film which had a cut-through temperature of greater than 420° C.

EXAMPLE 6

A polyamide-acid sulfone siloxane resin was prepared by charging a reaction vessel with 1.23 grams (0.005 mole) of the aromatic cyclic benzidine sulfone described in Example 1, 1.38 grams (0.005 mole) 1,3-bis-δ-aminoabutyltetramethyldisiloxane, 3.22 grams (0.01 mole) BPDA, and 17.47 grams N-methyl-2-pyrrolidone. The reaction mixture was stirred at room temperature to give a polyamide acid sulfone siloxane resin of about 25% solids having an intrinsic $[\eta]$ viscosity in the N-methyl-2-pyrrolidone of 0.22. A film was prepared from this solution by casting a portion of the solution on an aluminum plate and heating the film for one hour at 100° C., one hour at 150° C., one hour at 200° C. and 15 minutes at 250° C. to give a self-supporting flexible polyimide sulfone siloxane film which had a cut-through temperature of 260° C.

EXAMPLE 7

Employing the same conditions as recited in Example 1, a polyamide acid resin was prepared by effecting reaction between 2.5 g. (0.01 mole) 4,4'-methylene-3,3'-sulfonyldianiline, 3.22 g. (0.01 mole) BPDA and 17.1 g. of N-methyl-2-pyrrolidone. The reaction mixture was stirred at room temperature for about 15 minutes to give a polyamide acid resin of about 25% solids and was composed of recurring structural units of the formula

XIII

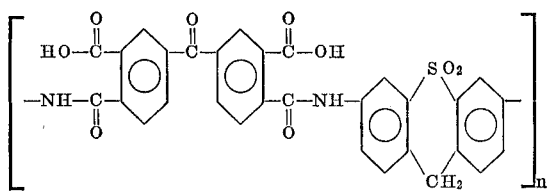

where $n$ is a whole number in excess of 1. A film was prepared from this solution by casting a portion of the solution on a glass plate and heating the film for one hour at 100° C., one hour at 150° C., one hour at 200° C., and 15 minutes at 250° C. to give a polyimide sulfone film which was extremely flexible and had a cut-through temperature of 410° C. This polyimide was composed of recurring structural units of the formula

XIV

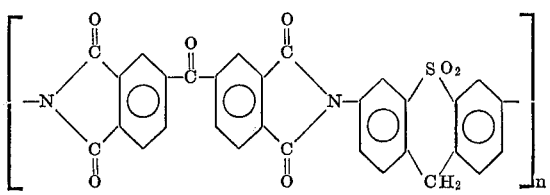

where $n$ is a whole number in excess of 1.

EXAMPLE 8

Employing the same conditions recited in Example 1, a polyamide acid is first prepared from 0.01 mole BPDA and 0.01 mole 2,8-diaminothiaxanthone dioxide, the polyamide acid solution thereby obtained is cast on a flat surface and is heated under the same conditions recited in Example 1 to give a polyimide of the corresponding cyclic sulfone having characteristic good cut-through temperature.

EXAMPLE 9

Employing the conditions recited in Example 2, a polyamide acid is prepared from 0.01 mole pyromellitic dianhydride and 0.01 mole 2,8-diamino-phenothiazine-5-dioxide and the polyamide acid solution thus obtained is cast as a film on a flat surface and is then heated under the conditions recited in Example 2 to give the corresponding polyimide.

EXAMPLE 10

Employing the conditions recited in Example 1, a polyamide acid is prepared from the reaction of 0.1 mole BPDA and 0.1 mole 2,8-diamino-phenoxathiin-5-dioxide and the formed polyamide acid as a cast film is converted to the corresponding polyimide by heating in the same manner described in Example 1 to give a flexible film having good cut-through temperature.

EXAMPLE 11

Employing the conditions recited in Example 2, 0.01 mole pyromellitic dianhydride is reacted with 0.01 mole 2,8-thianthrene-diamine-5,5,10,10-tetraoxide and the corresponding polyamide acid is cast on a glass surface to give a film which when heated under the conditions recited in Example 2 gives the corresponding polyimide in the form of a flexible film having desirable cut-through properties.

EXAMPLE 12

Employing the conditions recited in Example 2, a polyamide acid is prepared from the reaction of 0.01 mole pyromellitic dianhydride and 0.01 mole of a diamino

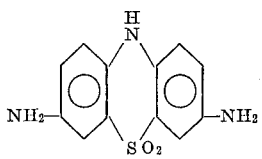

and the formed polyamide acid is converted to the corresponding polyimide by heating a cast sample of the polymer solution under the conditions recited in Example 2 to give a flexible film having good cut-through characteristics.

The polyamide acid compositions herein described, whether in solution form or in the solvent-free form, are shapeable either after depositing from the solvent or by molding techniques and can be made into films, filaments, tubings, etc. Thereafter by heating these polyamide compositions at temperatures ranging from about 150 to 300° C. for times in the order from 15 minutes to several hours or more, one forms the polyimide structure which is substantially infusible and insoluble. Obviously, the polyimide structures have properties which are even more desirable than the polyamide acids because of their infusibility and insolubility. However, the fact that the polyamide-acid resins are in an intermediate state of polymerization and therefore are soluble and shapeable, makes these compositions useful for a number of applications.

Thus, the polyamide-acid solutions can be applied to substrates, for example, metals (such as copper, brass, aluminum, steel, etc.), in the form of sheets, fibers, wires, screening, etc.; glass in the form of sheets, fibers, foams, fabrics, etc.; polymeric materials, for example, cellulosic materials such as wood, paper, etc.; polyolefins, such as polyethylene, polypropylene, polystyrene; polyesters, such as polyethylene terephthalate, etc.; perfluorocarbon polymers, such as polytetrafluoroethylene, copolymers of tetrafluoroethylene with hexafluoropropylene, etc.; polyurethanes, all polymeric materials in the form of sheets, fibers, foams, woven and non-woven fabrics, screening, etc.; leather, sheets, etc. Thereafter the polyamide-acid resin can be converted by the usual heat treatment to the polyimide structure with its improved physical and thermal properties.

Polyimide films and sheets made in accordance with our invention are especially useful in high temperature applications where resistance to solvents and high temperatures are a requirement. Thus, such films can be employed as a means for packaging and protective applications. Additionally, polymers and film-forming polymers herein described may be used in high temperature electrical applications, such as for slot liners, in transformer and capacitor applications, cable wrappings, etc. Finally, the structures made of the polyamide-acid polymers themselves or solutions of the latter, may be employed to treat various fibrous sheets which could then be heated to remove solvent (if present) and thereafter superimpose the sheets and heat them at elevated temperatures under pressure to convert the polyamide-acid resin to the polyimide state and form a tough, infusible and insoluble laminate highly resistant to heat. Fibers prepared from the polyamide-acid resin and ultimately converted to the polyimide state offer use for high temperature electrical insulation, protective clothing, filtration media, packing materials, brake linings, etc.

It will, of course, be apparent to those skilled in the art that in addition to the tetracarboxylic acid dianhydrides employed in the foregoing examples, other dianhydrides can be used, examples of which have been recited previously, without departing from the scope of the invention. In addition, other aromatic cyclic sulfones, many examples of which have been given above, can be used in place of the cyclic sulfones in the preceding examples with equal facility. Mixtures of dianhydrides as well as other organic diamines free of the cyclic sulfone grouping can be combined with the aromatic cyclic sulfone diamines to give new and useful products.

What we claim as new and desire to secure by Letters Patent of the United States is:

1. Compositions selected from the class consisting of (a) polyamide acids having an intrinsic viscosity of at least 0.1 when measured at 30° C. at a concentration of 0.5 percent by weight of the polyamide acid in N-methyl-2-pyrrolidone and composed of recurring structural units having the formula

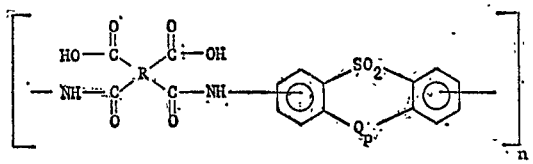

and (b)

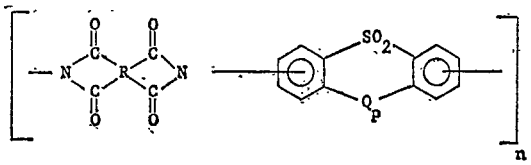

where R is an organic tetravalent radical containing at least one ring of six carbon atoms, said ring characterized by benzenoid unsaturation, the four carbonyl groups being attached directly to separate carbon atoms in a ring, each pair of carbonyl groups being attached to adjacent carbon atoms in a ring of the R radical, and the nitrogen atoms are meta or para to Q, Q is a member selected from the class consisting of —$CH_2$—, —$C(CH_3)_2$—, —$C(C_6H_5)_2$—, —O—, —S—, —$SO_2$—, —$Si(CH_3)_2$—, and —NR'—, where R' is hydrogen or methyl, n is an integer greater than one and p is a whole number from 0 to 1, inclusive.

2. A polyamide acid composed of recurring structural units of the general formula

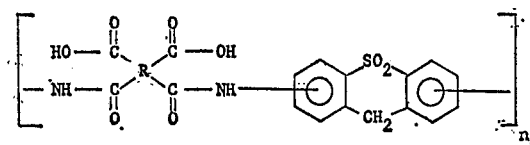

where R is an organic tetravalent radical containing at least one ring of six carbon atoms, said ring characterized by benzenoid unsaturation, the four carbonyl groups being attached directly to separate carbon atoms in a ring, each pair of carbonyl groups being attached to adjacent carbon atoms in a ring of the R radical and the nitrogen atoms are meta or para to the —$CH_2$— radical, and n is an integer greater than one and sufficient to provide said polyamide acid with an intrinsic viscosity of at least 0.1 when measured in a 0.5 percent by weight solution of the polyamide acid in N-methyl-2-pyrrolidone at 30° C.

3. A film-forming or fiber-forming polyimide composed of recurring structural units of the formula

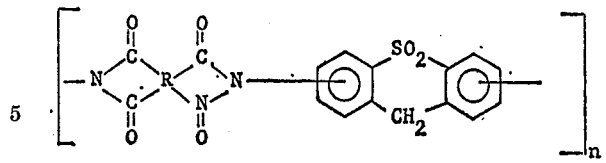

where R is an organic tetravalent radical containing at least one ring of six carbon atoms, said ring characterized by benzenoid unsaturation, the four carbonyl groups being attached directly to separate carbon atoms in a ring, each pair of carbonyl groups being attached to adjacent carbon atoms in a ring of the R radical, n is an integer greater than 1.

4. A polyamide acid composition of matter composed of recurring structural units of the formula

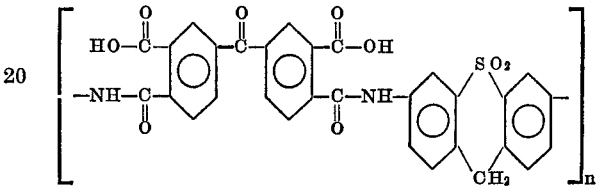

where n is a whole number in excess of 1, the said polyamide acid having an intrinsic viscosity of at least 0.1 when measured at 30° C. at a concentration of 0.5 percent by weight of the polyamide acid in N-methyl-2-pyrrolidine.

5. A polyamide acid composition of matter composed of recurring structural units of the formula

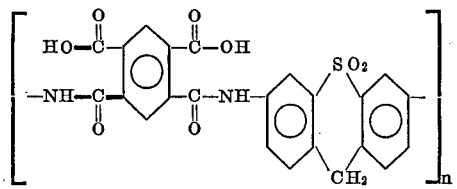

where n is a whole number in excess of 1, the said polyamide acid having an intrinsic viscosity of at least 0.1 when measured at 30° C. at a concentration of 0.5 percent by weight of the polyamide acid in N-methyl-2-pyrrolidone.

6. A polyamide acid composition of matter composed of recurring structural units of the formula

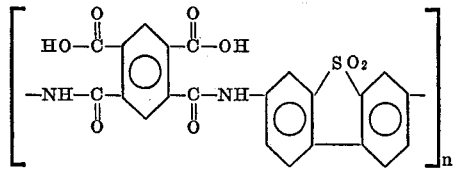

where n is a number in excess of 1, the said polyamide acid having an intrinsic viscosity of at least 0.1 when measured at 30° C. at a concentration of 0.5 percent by weight of the the polyamide acid in N-methyl-2-pyrrolidone.

7. A polyamide acid composition of matter composed of recurring structural units of the formula

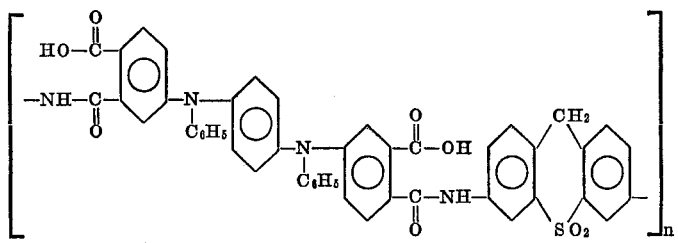

where n is a whole number in excess of 1, the said polyamide acid having an intrinsic viscosity of at least 0.1 when measured at 30° C. at a concentration of 0.5 percent by weight of the polyamide acid in N-methyl-2-pyrrolidone.

8. A polyamide acid composed of recurring structural units of the formula

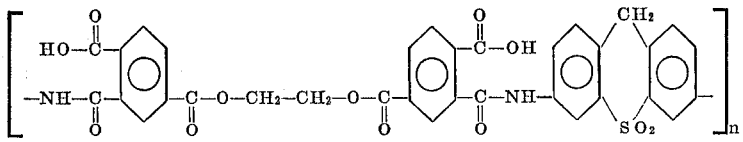

where $n$ is an integer greater than 1 and sufficient to provide said polyamide acid with an intrinsic viscosity of at least 0.1 when measured at 30° C. at a concentration of 0.5 percent by weight of the polyamide acid in N-methyl-2-pyrrolidone.

9. A film or fiber-forming polyimide composed of recurring structural units of the formula

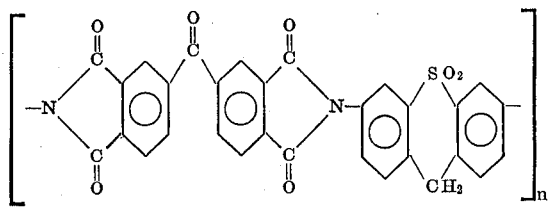

where $n$ is an integer greater than 1.

10. A film or fiber-forming polyimide composed of recurring structural units of the formula

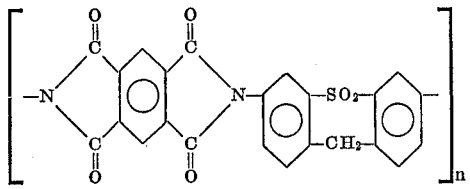

where $n$ is a whole number in excess of 1.

11. A film or fiber-forming polyimide composed of recurring structural units of the formula

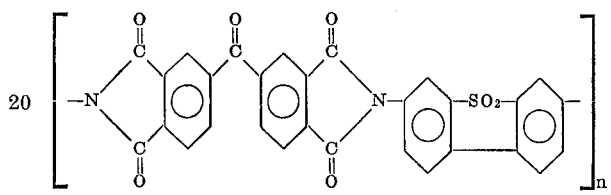

where $n$ is a whole number in excess of 1.

12. A film or fiber-forming polyimide composed of recurring structural units of the formula

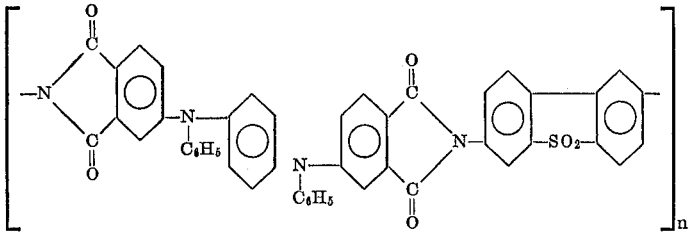

where $n$ is a whole number in excess of 1.

References Cited

UNITED STATES PATENTS

| | | | |
|---|---|---|---|
| 3,179,614 | 4/1965 | Edwards | 260—30.2 |
| 3,179,631 | 4/1965 | Endrey | 260—78 |
| 3,179,633 | 4/1965 | Endrey | 260—78 |
| 3,179,634 | 4/1965 | Edwards | 260—78 |

WILLIAM H. SHORT, Primary Examiner

H. SCHAIN, Assistant Examiner

U.S. Cl. X.R.

117—124, 128.4, 161; 161—227; 174—121; 260—9, 17.2, 30.2, 30.6, 30.8, 32.4, 32.6, 46.5, 47, 49, 328